May 16, 1967   R. J. FOX ETAL   3,320,495
SURFACE-BARRIER DIODE FOR DETECTING HIGH ENERGY PARTICLES
AND METHOD FOR PREPARING SAME
Filed July 2, 1963   3 Sheets-Sheet 1

INVENTORS
RICHARD J. FOX
CASIMER J. BORKOWSKI
BY Louis E. Davidson
ATTORNEY

INVENTORS
RICHARD J. FOX
CASIMER J. BORKOWSKI
BY *Louis E. Davidson*
ATTORNEY

United States Patent Office 3,320,495
Patented May 16, 1967

3,320,495
SURFACE-BARRIER DIODE FOR DETECTING HIGH ENERGY PARTICLES AND METHOD FOR PREPARING SAME
Richard J. Fox and Casimer J. Borkowski, Oak Ridge, Tenn., assignors, by mesne assignments, to the United States of America as represented by the United States Atomic Energy Commission
Filed July 2, 1963, Ser. No. 292,290
4 Claims. (Cl. 317—234)

This invention relates to an improved surface-barrier diode detector useful in the detection of a wide variety of ionizing radiation and to a process for preparing such a surface-barrier diode.

It is well known that when a high energy particle, such as an alpha particle, impinges upon a semiconductor particle detector, it passes into the semiconductive material producing hole-electron pairs in the semiconductive material. If an electric field is applied across the semiconductor, these holes and electrons will drift in the electric field and give rise to an external current. The integral of the current, the collected charge, can be used as a measure of the energy deposited in the semiconductor by the high energy particle and thus is a measure of the particle energy. If a recording device is connected to the semiconductor particle detector, a spectrum of the energy distribution of the incident particles can be obtained. This plot or energy spectrum can be used to identify radioisotopes since every radioisotope has its characteristic energy spectrum. At a given level of applied electric field, the semiconductive material will have a sensitive layer of finite thickness. If a particle which impinges upon the semiconductor gives up all of its energy to the semiconductor within this sensitive layer, then the semiconductor will be able to "detect" this particle and measure its energy. If the particle is of high enough energy that it passes beyond the sensitive depth of the semiconductor before it gives up all of its energy, the semiconductor detector can only utilize the portion of the energy given up within the senstive layer and thus will not accurately measure the energy of this particle. The depth of the sensitive layer can be increased by increasing the applied electric field and this is done in order to be able to detect higher energy particles. However, the increased voltage results in an increased "noise level" in the diode. "Noise" is caused by random motion of electrons in the semiconductor caused by reverse leakage current along the surface of the semiconductor. As the applied voltage is increased, this increased noise tends to overshadow the currents caused by the lower energy particles and thus tends to decrease the overall sensitivity and thus the utility of the detector.

Surface-barrier diodes are known to be useful as detectors for high energy particles. These diodes consist essentially of a solid semiconductor wafer of silicon, for example, having a metallic gold layer, for example, deposited on an etched surface of the semiconductor. Surface states between the N-type silicon semiconductor and the P-type gold provide the diode action. An electric potential or voltage is then applied across the gold-silicon combination through leads connected to the gold surface and to the opposite surface of the silicon wafer. Prior art silicon-gold surface-barrier diodes were limited in their use as particle detectors because of the shallow sensitive depth. Such detectors were useful for detection of alpha particles and operated at applied voltage (bias voltage) of about 500 volts. Increasing the applied voltage was not satisfactory in obtaining increased sensitivity for beta particles, for example, having energies as high as 1 m.e.v. (million electron volts).

It is therefore a principal object of the present invention to provide a surface-barrier diode having increased sensitive depth and improved energy resolution for high energy particles.

It is a further object of the present invention to provide a process for preparing such improved surface-barrier diode.

Figure 1:
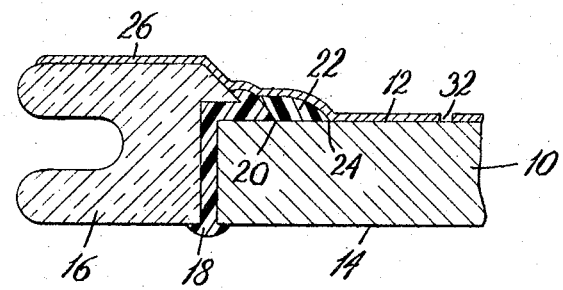
FIG. 1 shows a partial cross-section of an improved surface-barrier diode of the present invention.

With reference to FIG. 1, the surface-barrier diode consists of a silicon semiconductor 10 having an etched front surface 12 and a lapped back surface 14. The silicon is supported by a ceramic ring 16. The silicon is attached to the ceramic ring through adhesive or potting compound 18. Epoxy resins cured with amine catalysts are usually used for this purpose. The etched front surface 12 of silicon semiconductor 10 is normally only slightly N-type after etching, but due to the contact with the amine type epoxy potting material, the periphery of the silicon becomes strongly N-type, especially at the junction 20 where the etched surface 12 is first exposed. An epoxy material 22 which is free of amine material is then applied along the entire path of junction 20. The amine-free epoxy material produces a slightly P-type surface on high bulk resistivity silicon. The exposed surface of silicon is thus moved to 24. A conductive metal layer 26, such as gold, is then deposited, preferably by vacuum deposition techniques, along the exposed surface of the ceramic holder 16, amine-type epoxy resin 18, amine-free epoxy resin 22 and etched silicon surface 12. This gold layer is P-type. The P-N junction between the gold and silicon is thus at 20. When a bias voltage is applied between gold surface 26 and the lapped surface 14 of semiconductor 10, the electric field will be developed across the P-N junction 20, but the potential drop occurs over the longer path from junction 24 to junction 20 and thus higher potentials of about 1000 to 4000 volts can be employed without exceeding the breakdown potential of the P-N junction. These higher potentials enable the sensitive depth which extends into the silicon semiconductor from etched surface 12 to be increased to values as high as 1.5 mm. Thus higher energy particles, such as 1 m.e.v. electrons, can be detected and their energies measured.

Figure 2:
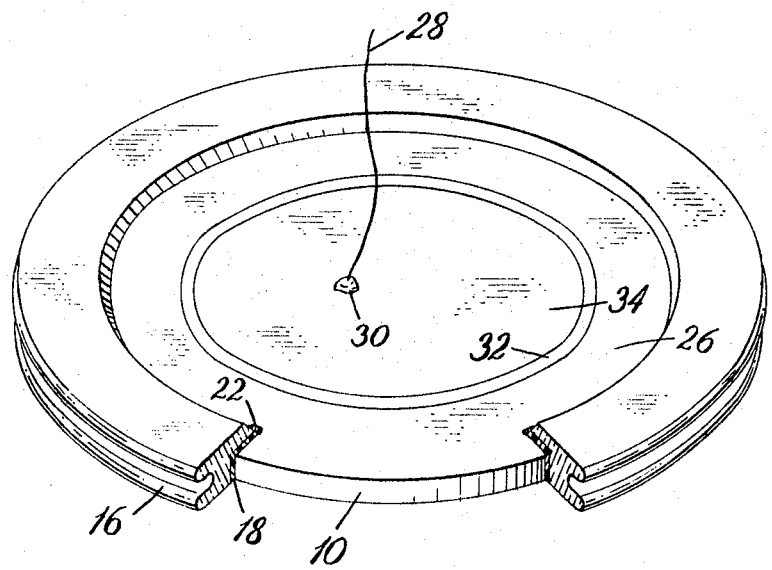
FIG. 2 shows an isometric drawing, partly in section, of an improved surface-barrier diode of the present invention.

With reference to FIG. 2, the surface-barrier diode is shown in isometric view with partial section. The silicon semiconductor 10, ceramic holder 16, amine-type epoxy resin 18, amine-free epoxy resin 22 and gold layer 26 are the same as described above in relation to FIG. 1. Electrical lead 28 is shown attached to the diode through adhesive 30, which is generally an amine-free epoxy resin. Lead 28 is attached by means of adhesive 30 to silicon 10 before the gold layer 26 is applied, but the lead 28 does not come in electrical contact with the silicon 10. When the gold layer 26 is applied, it covers the adhesive 30 and comes in electrical contact with lead 28. This is the preferred technique for attaching lead 28 to gold layer 26, but alternative techniques, such as direct attachment to a previously applied gold layer can also be employed.

In order to substantially eliminate electrical noise at the higher bias voltages employed in the improved surface-barrier diode, an insulating ring 32 is employed in the gold layer 26. This insulating ring is conveniently a gap in layer 26 which is obtained by masking during the deposition of layer 26 and then removing the mask. The detector region 34 is thus isolated from the border of the silicon; therefore electrical noise arising from the edge of the silicon no longer affects the detector. The combination of longer potential path through the P-N junction with an isolated detector region in the center of the semiconductor has been found to permit energy resolution and sensitive depths never heretofore achieved with a surface barrier detector.

The ceramic ring 16 is constructed from material, such as lavite, which has a thermal expansion substantially the same as that of the semiconductor 10. The semiconductor 10 is preferably fabricated from silicon but other materials, such as germanium, gallium arsenide and the like, could also be used. The metal layer 26 is preferably gold, but other metals, such as platinum, iridium, palladium, rhodium and the like, can also be used. Such metal layer must be formed from a high electrical conductivity material. Such material is also preferably a noble metal and thus inert to normal atmospheric oxidation so that it can be exposed to air and need not be maintained under vacuum or inert atmosphere.

The epoxy resins used for adhesive layer 18 between the semiconductor 10 and the ceramic holder 16 are typified by the diglycidyl ethers of bisphenol A (and its homologs); glycidyl ethers of glycerol; glycidyl ethers of bisphenol F; glycidyl ethers of long-chain bisphenols; and epoxylated novolacs. These epoxy resins are generally cured or hardened by amine catalysts. Such catalysts are exemplified by ethylenediamine, diethylenetriamine, triethylene-tetramine, tetraethylene-pentamine, acrylonitrile-diethylenetriamine adducts, dimethylaminomethylphenol and the like. These epoxy resins and their various amine curing catalysts are well known in the art. The amine-free epoxy resins employed for layer 22 employ curing catalysts such as organic dibasic and polybasic acids or acid anhydrides. The organic acids are exemplified by oxalic acid and the like and the acid anhydrides are exemplified by phthalic anhydride, maleic anhydride and the like. Such amine-free curing catalysts are also well known in the art.

The improved surface-barrier detector diodes of the present invention are prepared by cutting semiconductor wafers of desired size and thickness, lapping the surfaces of the wafer to desired smoothness, etching one surface of the wafer, cementing the wafer into a ceramic holder with amine-containing epoxy resin, followed by applying amine-free epoxy resin to the exposed wafer-epoxy junction, then applying a conductive metal layer to the etched surface of the wafer and forming on insulating ring in the metal layer which electrically isolates the central portion of the metal layer from the remainder of the metal layer. Preferably, the etched semiconductor material is stored at typical room ambient conditions for two or three days, either before or after depositing the metal layer. This process of aging results in a product that exhibits the most stable diode characteristics. This aging can be accelerated by exposing the semiconductor to oxidizing agents, such as hydrogen peroxide, sodium dichromate, wet oxygen, ozone and steam, or oxygen and steam.

The invention will be further described in the following examples relating to preparation of a surface-barrier diode and its use for detecting high energy particles.

*Example I*

A silicon wafer, about 0.020 inch thick and 1 in. dia., was cut from an ingot of 6000 ohm-cm., 1-millisec. lifetime, N-type, float-zone refined silicon. Both faces of the wafer were machine lapped to produce extremely smooth and parallel faces. The resultant wafer was about 0.010 inch thick. The wafer was then etched on one side in a conventional etching solution, such as 4 min. in a mixture of hydrofluoric, glacial acetic and nitric acids in a volume ratio of 3:4.5:5. The opposite side of the wafer was masked during the etching by a vacuum manipulating tool, such as a bulb suction cup. This etching removed about 0.003 inch of silicon and produced a clean specular surface. Immediately after being rinsed with distilled water and with the mask still attached, the wafer was immersed in a 1 weight percent sodium dichromate solution at 70° C. for 15 min., rinsed with distilled water, and the etched face was blown dry with filtered air. The wafer was removed from the mask (the edge of the wafer may be handled, but the etched face should not be touched) and cemented into an insulating ceramic mounting ring with an amine-containing epoxy resin comprising the diglycidyl ether of bisphenol A and ethylene diamine curing catalyst in a 10:1 weight ratio. The inner edge of the epoxy resin should be visible all around the inner diameter of the ceramic mounting ring. The amine-containing epoxy resin was cured at room temperature for 24 hours. A narrow but continuous secondary ring (about 1/32-in. wide) of amine-free epoxy resin comprising the diglycidyl ether of bisphenol A and phthalic anhydride curing catalyst in a 5:1 volume ratio was placed around this same inner edge. An eye-dropper drawn down to a small tip is convenient for doing this, but the silicon surface should not be touched with the glass tip. This amine-free epoxy resin also contained about 1 weight percent iodine which aided in rendering the amine-free epoxy layer P-type. The presence of iodine was preferred but was not necessary. A short 0.002-in. dia. gold contact wire was beaded in a flame and the beaded end was attached to the center of the etched face of the silicon with a 1-mm. dia. drop of the above described amine-free epoxy resin. The silicon surface should not be touched with the wire. A simple micromanipulator was used to hold the wire in place while the epoxy cured. This cure took place in about 1 min. with the application of a little radiant heat. A solid masking ring about 0.5 cm. inside diameter and having a wall thickness of about 0.5 mm. was placed in the center of the etched surface of the silicon wafer. A thin layer of gold (about 50–100 micrograms/sq. cm.) was deposited onto the entire face of the assembly by vacuum evaporation from a multipoint source. The masking ring was then removed leaving a 0.5 mm. wide insulated circular gap in the gold layer which formed an isolated central detector section about 20 sq. mm. in area. For the back contact an evaporated gold film was deposited on the lapped surface of the silicon wafer.

*Example II*

Figure 3:
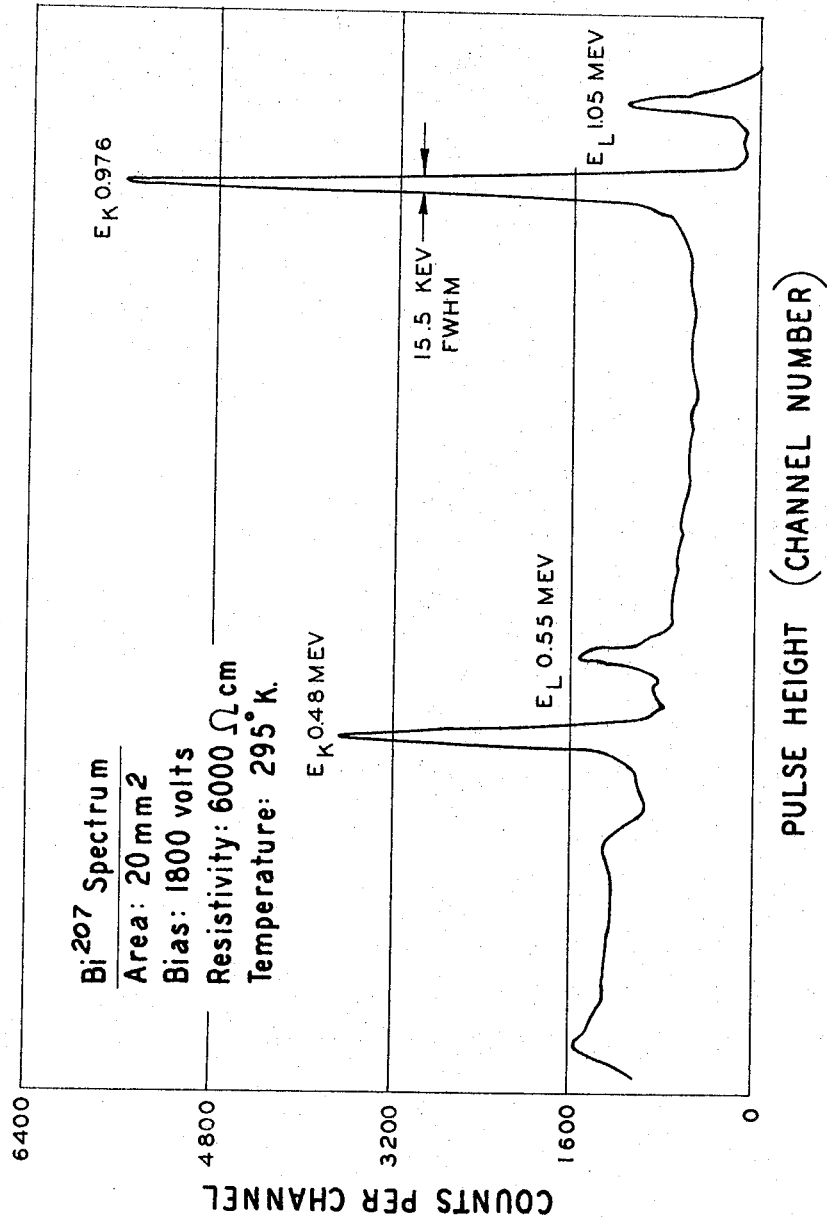
FIG. 3 is the $Bi^{207}$ spectrum obtained with a surface-barrier diode of the present invention.
Figure 4:
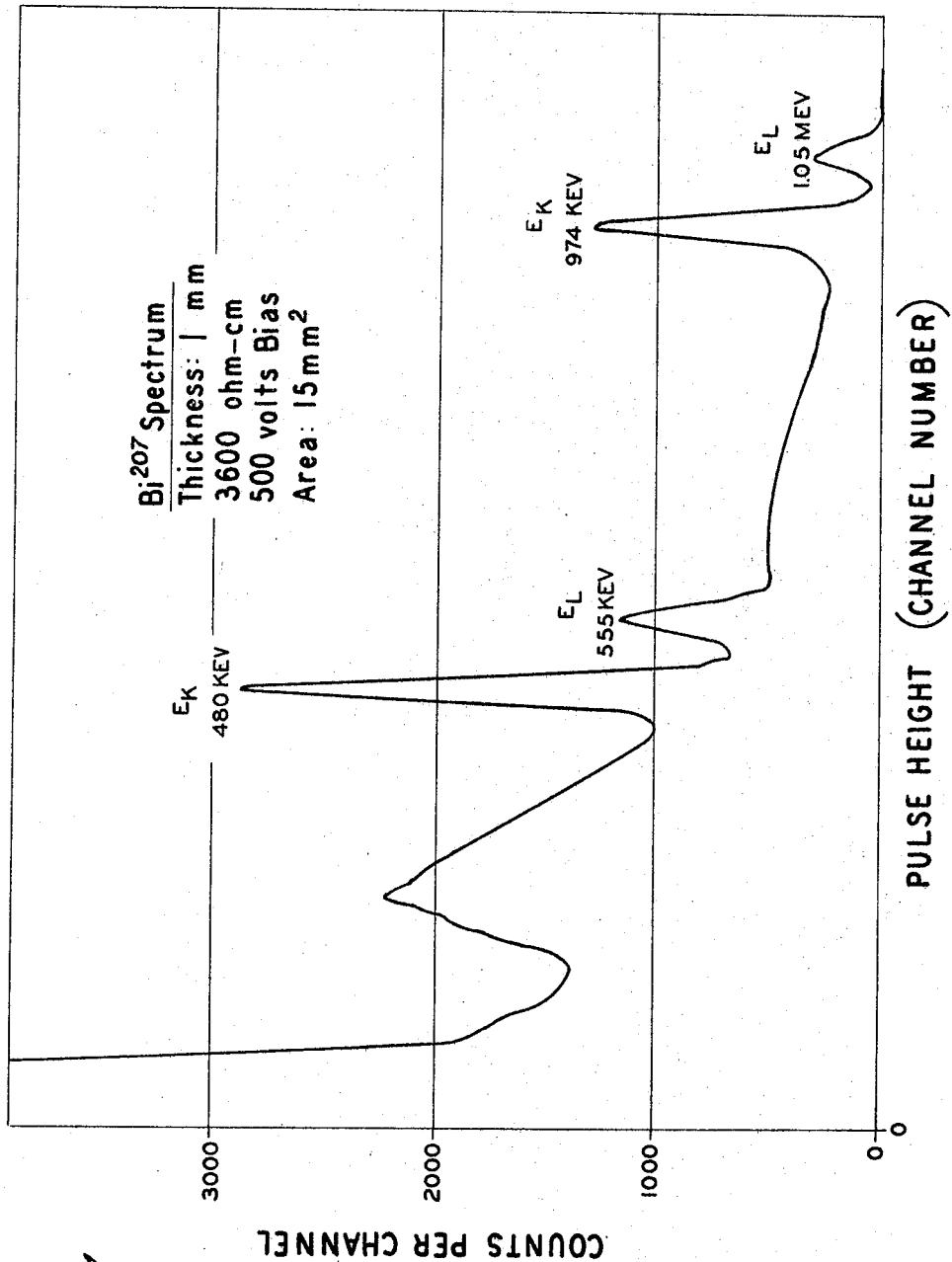
FIG. 4 is the $Bi^{207}$ spectrum obtained with a prior art diode.

A silicon-gold surface-barrier diode fabricated according to Example I above was used to detect high energy particles. A reverse bias voltage of 1800 volts was applied to the detector while it was maintained at a temperature of about 22° C. (room temperature). The contacts of the diode were connected to the input of a low-noise charge sensitive preamplifier with 1 microsecond integrating and clipping times. A phase inverter was added to the output of the preamplifier since the above detector produces positive going pulses. The output of the phase inverter was connected to the input of a well known pulse height analyzer and recording device for recording the energy spectra of particles which impinge on the detector area of a surface-barrier diode. The pulse height analyzer is a well known device for counting the number of particles having specific energy levels. A $Bi^{207}$ radioisotope was placed in proximity to the surface barrier diode and the spectrum of FIG. 3 was obtained. This spectrum showed a resolution (FWHM—full width at half maximum) of 15 k.e.v. at 1800 volts bias. The depletion depth was 1.5 mm. which is approximately the range required for the 1 m.e.v. conversion electron. This is a distinct improvement over the spectrum of FIG. 4 obtained with a prior art diode for $Bi^{207}$. Note the difference in height of the 0.974–0.976 m.e.v. peak in both spectra. In FIG. 3 it is higher than the 0.48 m.e.v. peak which indicates increased sensitivity of the improved diode for higher energy particles. The resolution of the spectrum of FIG. 3 is also better than the spectrum of FIG. 4. The $E_K$ and $E_L$ energy levels shown in FIGS. 3 and 4 refer to the equivalent energies of conversion electrons from the K and L shells of an atom.

While the above data of FIG. 3 were obtained at 1800 volts bias, it should be understood that up to at least 4000 volts bias can be used with the improved surface-barrier diode of the present invention without breakdown of the P-N junction. This detector can be used for detection of alpha particles, fission fragments, electrons, protons, energetic heavy ions and neutrons (using a radiator such as $Li^6$). It is also preferable to use high resistivity silicon since the higher resistivity will extend the particle energy range in which the device will have desirable linear response.

What is claimed is:

1. A surface-barrier diode which comprises a semiconductor wafer, a ceramic holder, an amine-containing epoxy resin which bonds the semiconductor wafer to the ceramic holder, an amine free epoxy resin which covers the exposed junction of the amine-containing epoxy resin and the semiconductor wafer, a conductive metal layer deposited on the surface of the semiconductor wafer, the amine-free epoxy resin and the ceramic holder and an insulating ring which electrically isolates the central portion of the metal layer.

2. A surface-barrier diode which comprises a silicon wafer having an etched surface, a ceramic holder, an amine-containing epoxy resin which bonds the silicon wafer to the ceramic holder, an amine-free epoxy resin which covers the exposed junction of the amine-containing epoxy resin and the etched surface of the silicon wafer, a gold layer deposited on the etched surface of the silicon wafer, the amine-free epoxy resin and the ceramic holder, and an insulating ring which electrically isolates the central portion of the metal layer.

3. A process for preparing a surface-barrier diode which comprises cutting a semiconductor wafer, lapping the surfaces of the wafer, etching one surface of the wafer, cementing the wafer into a ceramic holder with amine-containing epoxy resin, applying amine-free epoxy resin to the exposed junction of the amine-containing epoxy resin and the etched surface of the semiconductor wafer, applying a conductive metal layer to the etched surface of the wafer and forming an insulating ring in the metal layer which electrically isolates the central portion of the metal layer.

4. A process as claimed in claim 3 wherein the semiconductor wafer is silicon and the metal layer is gold.

References Cited by the Examiner

Fox and Borkowski: Proceedings of the Eighth Scintillation Counter Symposium, Institute of Radio Engineers Inc., June 1962. Talks given Mar. 1–3, 1962 (pp. 213–216 relied on).

JOHN W. HUCKERT, *Primary Examiner.*

M. EDLOW, *Assistant Examiner.*